2,762,681

METHOD OF SCOURING RAW WOOL WITH NON-IONIC DETERGENTS AND FLOCCULATING THE WASTE EFFLUENT WITH ALUM

Thomas N. Crowley, Clifton, N. J., assignor to American Chemical Paint Company, Ambler, Pa., a corporation of Delaware No Drawing. Application May 1, 1952,
Serial No. 285,560

5 Claims. (Cl. 8—139)

This invention relates to the art of scouring wool and is particularly concerned with the provision of a process in which the waste effluent from the scouring bowls may be sufficiently purified so that the water can be either discharged into streams, lakes, sewers, etc. without objectionable pollution thereof, or returned to the wool scouring bowls without impairing the scouring efficiency.

Before proceeding to a detailed description of my invention, it should be noted that the purification of wool scouring wastes is a difficult and expensive operation, and further, that no simple or completely satisfactory purification system has heretofore been available to the industry. For instance, when scouring wool with an alkali soap solution, the resulting waste liquor is highly objectionable. It is usually brown, thickly turbid and covered with a greasy scum which contains undesirable organic matter and fine solids in suspension as well as undesirable dissolved materials. Furthermore, these waste liquors are unusually odoriferous and upon putrefaction they become extremely obnoxious. Various purification processes have been in use but none of them has proven satisfactory for adequate reduction of the pollution load upon discharge of effluent.

Still referring to present practices, it has been suggested, for example, that wool scouring wastes be treated with such chemicals as hypochlorite and alum, but such treatments have not proven successful. This lack of success has been due to a number of factors, among which might be mentioned the extreme bulkiness of the solid matter resulting from the clarification of the waste liquor and the excessive cost of the operation. For example, where calcium hypochlorite has been used, the reduction of the bacterial oxygen demand (B. O. D.) and the degree of improvement in the clarity of the treated waste effluent have not been sufficient to be satisfactory to State and Municipal authorities. Centrifugal processes have also been suggested but even the most efficiently operated plants of this type have had to discharge waste liquors containing highly objectionable materials.

Among the principal objects of my invention is the provision of a wool scouring process which greatly reduces, if not entirely eliminates, the difficulties of disposing of the liquid waste from the wool scouring bowls. At the same time, it is also an object of my invention to provide a process which is extremely simple and economical to carry out. Another object of the invention is to provide a wool scouring process including a waste disposal process which, to a large extent, can be cyclic in nature; i. e., a process in which the water can be returned to the scouring bowls thereby affording a marked saving in the amount of water required, as well as a saving in chemical and other costs.

Briefly stated, the present invention is based upon the discovery that when wool is scoured in an aqueous medium containing a synthetic detergent as a principal scouring agent, the resulting waste effluent may be treated with alum, and after separation of the "dirt" and subsequent further treatment, may be reused in the scouring process or discharged to waste without objectionable pollution to streams, etc.

According to the present invention the first step is to scour the wool by means of an aqueous bath containing a synthetic detergent as a principal or essential scouring agent. Some alkali soap may be added if desired, but I prefer to operate without such soap. Where a non-ionic synthetic detergent is employed no special treatment is required to prepare the waste for the disposal process of the present invention. The same is true of some other synthetic detergents as will further appear. However in instances where it has been found to be desirable to fortify the synthetic detergent scouring medium with some alkali soap, before proceeding with the waste treatment process of the present invention, it is necessary to reduce the pH of the waste liquor from the scouring bowls to around 5.0 to 6.5. This step is required in order to get rid of any of the carbonate (alkali) which, if not removed before the treatment to be described below, would later cause a voluminous precipitate. Any such alkalinity may be neutralized by adding an acid such as sulphuric, hydrochloric, phosphoric, acid salts, etc.

In connection with the use of alkali soap, it should be noted that the quantity added to the scouring medium when it is desired to add any at all, obviously is considerably less than that which is employed in conventional soap alkali wool scouring. In other words, the synthetic detergent is the principal scouring agent.

According to the present invention, the waste effluent is conducted into a settling chamber where alum[1] is added in predetermined quantities accompanied by thorough admixture of the mass as by aeration or by means of a suitable stirring mechanism. The alum will flocculate the admixture which may then be allowed to rest so that the flocculated material settles to the bottom of the chamber. After separation is complete, the mixture is subjected to physical or mechanical separation in any preferred manner as by decantation, or through the use of a centrifuge, etc. If a non-ionic detergent has been employed, the clear supernatant layer contains valuable chemicals which can be recovered if desired for reuse in the scouring process. The reason for this is that the non-ionic detergents are not affected by alum. In addition, there are other synthetic detergents which are not affected by alum and these also can be employed with my invention. The non-ionic detergents which are especially useful with my invention are disclosed in U. S. Letters Patent No. 2,570,050 and those non-ionic detergents having the general formula $RO(C_2H_4O)_nR_1$ in which R stands for an alkyl, aryl, aralkyl, alkyl-aryl, or acyl radical containing at least 10 carbon atoms; $n$ having a value from 8–12 and $R_1$ standing for alkyl, aryl, aralkyl, alkyl-aryl, acyl radical or a hydrogen atom. Other suitable non-ionic detergents would be condensation products of ethylene oxide and sorbitan esters of tall oil. Examples of other synthetic detergents which are not affected by alum are sodium glyceryl lauryl sulphate or other organic sulphates or sulphonates, polyoxyalkylene derivatives of sorbitan monolaurate and sodium cetyl sulphate. It will be noted that all of these synthetic detergents are surface-active or wetting agents as distinguished from grease solvents.

The clear supernatant liquid also represents a considerable volume of water. For this reason, it is highly desirable that it be saved and subsequently returned to the wool scouring process in accordance with my preferred procedure although, if such procedure is not desired, the clear liquor may be discharged to streams, lakes, sewers, etc., inasmuch as it has a greatly reduced B. O. D. com- ---
[1] Alum in this specification refers to aluminum sulphate as used in the water treatment industry and its obvious equivalents in water treatment.

pared to conventionally treated wastes and thus does not constitute any appreciable disposal hazard. For instance, compared to the original waste liquor, the reduction in B. O. D. of clarified waste effluent may be as much as 90%. The reduction in suspended solids is practically 100%.

The sludge layer separated as described is a brown viscous mass containing grease globules and organic matter, as well as mineral matter. This mass lends itself exceptionally well to vacuum filtration, centrifugal dewatering or dewatering by means of a filter press. If centrifugal dewatering or dewatering by means of a filter press is employed, the semi-solid cake material may be disposed of by burning or used as a fertilizer. However, I prefer to subject the sludge layer to the action of a filter press or other pressure filtering means which facilitates the recovery of wool grease, and in this event, it is necessary that the precipitated mass be heated to at least 140° F. before it is subjected to the action of the pressure filtering means. During the time that the pressure on the filter is low, the emerging water is clear and contains no wool grease so that it may be returned to the scouring process after subsequent treatment in accordance with my invention, or otherwise disposed of. At higher pressures which occur as the filter becomes full, usually at or above 30 pounds per square inch, the emerging water carries with it valuable wool grease which may be removed by a skimming operation, centrifuge, etc. The grease reclaimed by this process exhibits chemical properties similar to that reclaimed from solvent extraction or solvent wool scouring in that it is considerably lower in fatty acid content than the grease obtained from acid cracking or calcium hypochlorite treatment of conventional soap alkali scouring methods.

Where, as I prefer, the clarified waste effluent is to be returned to the process it must be further treated and in referring to clarified waste effluent, I include the clear supernatant liquid obtained in the settling chamber as well as the clear liquid obtained by dewatering the sludge layer.

The treatment of this clear liquid consists in adjusting the pH of the effluent upwards to a sufficient degree to insure the further precipitation of any aluminum remaining in solution. Such an adjustment may be made by means of the addition of an alkaline material such as sodium carbonate or sodium hydroxide. Normally the pH is adjusted to approximately 7. As the pH approaches neutrality this further flocculation takes place in the clarified effluent. This floc comprises minute crystals of aluminum hydroxide. It is necessary to separate this flocculant by decantation, centrifugal separation, etc. After such separation the liquid portion is entirely suitable for return to the scouring system.

The flocculated aluminum hydroxide may be treated with sulphuric acid to regenerate alum, which, of course, may be used in the treatment of additional waste effluent.

As already indicated, the preferred embodiment of my invention includes the recycling procedure because such a process leads to an extreme reduction in the amount of waste to be disposed of. For instance, by recycling, a reduction of 95% in the B. O. D. of the material discharged to streams is not unexpected. In one plant before the process of the present invention was installed over 100,000 gallons of raw waste containing four thousand (4,000) p. p. m. B. O. D. were normally discharged each week whereas, after the process of the present invention was installed, only 30,000 gallons of a vastly clarified waste effluent containing only 800 p. p. m. B. O. D. were discharged each week. This clearly illustrates the immense practical importance of the recycling process.

There are numerous factors affecting the chemical requirements necessary for satisfactory treatment of the raw waste effluent. The wool normally encountered in an installation loses from 20 to 70% by weight in the scouring process. From 5 to 10% of dirt may be removed mechanically prior to the time the wool enters the scouring system. The remaining impurities must be removed during the scouring process with the exception of the minute amount of wool grease which remains in the wool as "residual grease." These impurities fall into three broad classifications: (1) wool grease; (2) suint or soluble salts; (3) insoluble matter or dirt. The ratio in which these impurities are present is a function of the point of origin of the wool, its "height" etc. The volume of water and the quantity of cleansing agent will likewise vary with the wool to be scoured. Generally speaking, it takes from 75 to 150 gallons of water to scour 100 pounds of raw wool.

While it is obviously impossible to state exact amounts of alum to be added to the scouring waste, I have found that it usually takes from 2½ to 10 pounds alum for each 100 pounds of wool scoured. As the sand and dirt are easily removed, "a rule of thumb method," for determining the amount of alum to be added is the following: when the amount of suint salts is low a small amount of alum is needed; when the amount of suint salts is high a large amount of alum is needed. When subsequent "alkalizing" by means of sodium carbonate or sodium hydroxide takes place, it has been found that 1½–5 pounds sodium carbonate for each 100 gallons of solution is normally necessary to insure thorough removal by subsequent separation of any of the aluminum remaining in the solution. Proportionate amounts of sodium hydroxide or other "alkalizing material," quite naturally, may be substituted for the sodium carbonate.

By way of specific example, the following is cited as representative of the procedure characteristic of my invention: In an installation capable of handling approximately 30,000 pounds of grease wool per day, the waste water which is discharged from the scouring bowls will approximate as much as 40,000 gallons. This waste water is discharged preferably into a series of four 10,000-gallon tanks suitable for settling purposes. The tanks are filled in order and the discharged waste becomes increasingly more concentrated from the first 10,000 gallons to the last 10,000 gallons.

Where the scouring medium is a synthetic detergent with which no alkali soap has been employed, there is, of course, no necessity for treating the waste water with acid prior to the alum treatment now to be described. However, if some alkali soap has been employed, there should be a pre-treatment with acid as described above.

As each 10,000-gallon tank is filled, it is thoroughly agitated and a sample is taken therefrom. A standard solution containing a known amount of alum is prepared and by means of a burette some of the alum solution is added to a known quantity of the sample. By carefully observing the amount of alum solution necessary to insure good flocculation of the measured sample, the amount of alum which should be added to the 10,000 gallons of waste water in the first tank can be easily calculated and so on for each tank and this amount of alum is then added to the tank and the contents thoroughly agitated, preferably by aeration, for a period which normally need not be greater than of 10 minutes duration. Of course, other means of agitating the mass can be employed, if desired, and the period of agitation may, of course, vary with the type of agitation.

After agitation, the mixture is permitted to stand for from 8 to 12 hours, at the end of which time approximately 90% of the concentration possible through gravity settling will generally have been achieved. The clear supernatant liquor is then decanted and pumped to any suitable collecting tank.

The sludge at the bottom of each settling tank is removed, preferably to a tank in which pressure can be applied, where it is heated to approximately 200° F., after which the mixture is pumped to a filter press. The first liquid to emerge from the filter press is clear and may be sent to the same tank in which the clear supernatant liquor has been collected.

As the pressure in the filter approaches 30 pounds per square inch, the emerging liquor has on its surface some valuable wool grease, and at this point it is delivered to a centrifugal separator, where the grease may be separated from the effluent. The clarified effluent resulting from this operation is also delivered to the tank in which the clear, supernatant liquid has been collected.

At the conclusion of the run, the filter press is broken down and the semi-solid mass therein disposed of by burning, or by using as a fertilizer, etc.

The clarified liquor which has been accumulated will be found to have a pH of approximately 4 and enough sodium carbonate is added thereto to raise the pH to approximately 7.0. The contents of the tank is now thoroughly agitated and the flocculated material is separated either by settling, centrifuging, etc. This finally clarified effluent may now be returned to the wool scouring process.

If desired, the aluminum hydroxide which results from the treatment with alum and which has been separated by means of centrifugation or decantation may be treated with sulphuric acid to form aluminum sulphate (alum) which may be once more used in the process.

The specific procedure just described represents on the whole an actual reduction in B. O. D. which may be discharged to streams of approximately 98%. This reduction, coupled with the almost minute quantities of liquid which are discharged, represents a tremendous saving for the wool scourer.

I claim:

1. The method of cleaning raw wool which comprises washing raw wool in an aqueous bath containing, as its principal and essential scouring agent, a detergent from the class which consists of non-ionic, synthetic, organic surface active agents; collecting waste liquid effluent from the bath after said washing step; adding to the collected effluent and thoroughly mixing therewith sufficient alum to effect flocculation of the effluent; and separating the flocculated material and the clarified liquid.

2. The method of claim 1 wherein the pH of the clarified liquid is adjusted upwardly sufficiently to insure precipitation as water insoluble compounds of substantially all of any dissolved aluminum remaining in the liquid, and finally separating the liquid and the precipitated insoluble compounds.

3. The method of claim 1 wherein the sludge resulting from the use of alum is heated to at least 140° F. and then dewatered.

4. The method of claim 2 in which the pH of the clarified waste effluent is adjusted to approximately 7.

5. The method of claim 2 in which the clarified liquid separated by the final step is returned for reuse in the scouring step.

References Cited in the file of this patent

UNITED STATES PATENTS

| | | |
|---|---|---|
| 622,401 | Spence | Apr. 4, 1899 |
| 1,377,790 | Poole et al. | May 10, 1921 |
| 1,964,444 | Urbain | June 26, 1934 |
| 2,183,142 | Mackenzie | Dec. 12, 1939 |
| 2,240,403 | Karlstrom | Apr. 29, 1941 |
| 2,264,448 | Moller et al. | Dec. 2, 1941 |
| 2,297,986 | Rowland et al. | Oct. 6, 1942 |
| 2,310,009 | Baker et al. | Feb. 2, 1943 |
| 2,429,868 | Campanella | Oct. 28, 1947 |

FOREIGN PATENTS

| | | |
|---|---|---|
| 508,371 | Great Britain | June 29, 1939 |

OTHER REFERENCES

Gehm: Water Works and Sewerage, August 1945, pp. 255–257. (Copy in Patent Office Library.)

Mellor's Modern Inorganic Chemistry, revised edition 1939, page 669. (Copy in Patent Office Library and Division 43.)